(12) United States Patent
Amroun et al.

(10) Patent No.: US 8,581,837 B2
(45) Date of Patent: Nov. 12, 2013

(54) METHOD AND DEVICE FOR TRACKING SWEET SPOTS

(75) Inventors: Sebastien Amroun, The Hague (NL); Armin Schwerdtner, Dresden (DE)

(73) Assignee: Seereal Technologies GmbH, Dresden (DE)

( * ) Notice: Subject to any disclaimer, the term of this patent is extended or adjusted under 35 U.S.C. 154(b) by 1440 days.

(21) Appl. No.: 11/817,034

(22) PCT Filed: Feb. 24, 2006

(86) PCT No.: PCT/DE2006/000375
§ 371 (c)(1),
(2), (4) Date: Aug. 24, 2007

(87) PCT Pub. No.: WO2006/089542
PCT Pub. Date: Aug. 31, 2006

(65) Prior Publication Data
US 2008/0246753 A1    Oct. 9, 2008

(30) Foreign Application Priority Data

Feb. 25, 2005 (DE) .......................... 10 2005 010 250
Aug. 17, 2005 (DE) .......................... 10 2005 040 597

(51) Int. Cl.
*G09G 5/00* (2006.01)
(52) U.S. Cl.
USPC ............... 345/156; 345/157; 345/214; 345/7; 345/8; 348/51; 715/856; 715/857; 715/858; 715/859; 715/860; 382/103
(58) Field of Classification Search
USPC ............ 345/214, 629, 156–157, 7–8; 348/59, 348/54, 55, 51; 359/443, 462; 715/856–860; 382/103
See application file for complete search history.

(56) References Cited

U.S. PATENT DOCUMENTS

| 5,132,839 | A | * | 7/1992 | Travis ........................... 359/462 |
| 5,696,892 | A | * | 12/1997 | Redmann et al. ............. 345/582 |
| 5,771,066 | A | * | 6/1998 | Barnea ............................ 348/59 |
| 5,912,721 | A | * | 6/1999 | Yamaguchi et al. .......... 351/210 |
| 2003/0214710 | A1 | * | 11/2003 | Takahashi et al. ............ 359/443 |
| 2008/0117231 | A1 | * | 5/2008 | Kimpe ........................... 345/629 |

FOREIGN PATENT DOCUMENTS

| DE | 4309667 | 9/1994 |
| JP | 2000197075 | 7/2000 |
| WO | WO 2005 027534 | 3/2005 |
| WO | WO2005060270 | 6/2005 |

OTHER PUBLICATIONS

Jung-Young Son, Parameters for designing autostereoscopic imaging systems based on lenticular, parallax barrier, and integral photography plates, Optical Engineering, Nov. 2003, pp. 3326-3333, vol. 42 No., 11, Soc. of Photo-Optical Instrumentation Engineers, Bellingham, US.

Sung-Sik Kim, The optical design and analysis for super-multiview three-dimensional imaging system, Proceedings of the spie, Jan. 22, 2001, pp. 222-226, vol. 4297, Spie, Bellingham, VA, US.

* cited by examiner

*Primary Examiner* — Lun-Yi Lao
*Assistant Examiner* — Olga Merkoulova
(74) *Attorney, Agent, or Firm* — Saul Ewing LLP

(57) ABSTRACT

The invention relates to a method and device for tracking the sweet spots of a sweets spot unit for a transmissive electronic display. The aim of the invention is to improve the reproduction quality and the uniformity of illumination in displays of this type. The display contains a sweet spot unit consisting of an illumination matrix (1) and reproduction elements, in addition to an image matrix (4). Once the position of at least one observer's eye (6) has been determined by a control unit using inverse ray tracing, address data for activating illumination elements (LE) of the illumination matrix (1) is provided from the position data in order to prepare the defined sweet spots (5) for said observer's eye (6). To improve the reproduction quality, an additional optical component is used in ray path for the inverse ray tracing process. In addition to the viewing angle (α) of the observer, the control unit detects and takes into consideration a defined angle (θ) of a scattering or diffractive element in a predetermined angular range. The permits additional address data to be activated for the illumination elements (LE) and the defined sweet spot (5) can be illuminated in a uniform manner.

17 Claims, 3 Drawing Sheets

METHOD AND DEVICE FOR TRACKING SWEET SPOTS

CROSS REFERENCE TO RELATED APPLICATIONS

This application claims the priority of PCT/DE2006/000375 filed on Feb. 24, 2006; DE 10 2005 010 250.6 filed on Feb. 25, 2005; and, DE 10 2005 040 597.5 filed on Aug. 17, 2005, the entire contents of which are hereby incorporated in total by reference.

BACKGROUND OF THE INVENTION

This invention relates to a method and a device for tracking sweet spots of a sweet spot unit used in a transmissive electronic display for displaying information, said method and device imaging light after modulation with the information by the display in a directed manner on to observer eyes of at least one observer in sweet spots.

This invention can be applied in monoscopic and/or autostereoscopic displays for one or multiple observers. A display device according to this invention allows images to be displayed optionally in a two-dimensional, in a three-dimensional mode or in a mixed mode. In this document, the term "autostereoscopic display" denotes a display device using which at least one observer can view three-dimensional images without any additional aids from a large number of positions to be chosen freely by the observer.

Seen in the direction of light propagation, the sweet spot unit of a display comprises an illumination matrix with a multitude of illumination elements which emit or transmit light, and imaging means with imaging elements. The imaging means image the light of activated illumination elements of the illumination matrix on to the eyes of at least one observer in the form of one or multiple sweet spots in more or less ideal bundles of parallel rays. For this, a multitude of illumination elements are assigned to each imaging element of the imaging means. Sweet spots are regions in which information provided on the information panel can be viewed at high quality.

The homogeneity of the information displayed on the information panel must be ensured in the sweet spots at all times, and cross talk of information among the eyes of an observer must be prevented when viewing three-dimensional contents. These conditions must continue to be fulfilled if the observer changes their position in the space in front of the display device, so that the observer is continuously provided with high-quality monoscopic or stereoscopic image contents. For example, in a monoscopic display used in a vehicle the driver is shown a route map while a passenger can watch a movie. Both persons should be able to move in a certain range without losing their specific information.

Further, it has been shown that disturbances and imaging defects are likely to occur already if the number of light sources activated for a defined sweet spot is only slightly too small or too large. For example, observers may experience cross talk between individual sweet spots, and the image quality, for example homogeneity and contrast, may deteriorate. The human eye perceives such changes very easily.

Autostereoscopic displays are expected to present high-quality three-dimensional scenes, but also to exhibit properties which are irrespective of the number of observers, such as free and independent mobility of observers and optional access to multiple representations in a two-dimensional and/or three-dimensional mode.

In order to be able to fulfil all those requirements to an optimal degree, a suitable tracking system will be necessary which provides information for subsequent processing in tracking devices and for stereoscopic display of information. Such a tracking system must be capable of continuously detecting observer movements in front of the display device in a viewing space which is as large as possible, so that each observer is always provided with their specific image information irrespective of their actual position. This makes great demands on the accuracy of the position finders, on the quality of individual elements of the display and on the imaging quality of the display as a whole.

There are tracking systems which use mechanical, optical and other means, or combinations thereof, for tracking. However, these systems suffer from disadvantages which adversely affect their accuracy or suitability in real-time applications. Their design is often voluminous, and the viewing space in which the observers can be provided with information is very limited. Moreover, the required computing time increases considerably the more factors are to be considered in the process from position detection to information provision.

The document WO 03/053072 A1 discloses a multi-user display with a tracking system which collects three-dimensional position information and with sequential presentation of stereoscopic images. The display comprises, one after another, a backlight which can be addressed three-dimensionally, a large-area imaging lens for focusing light on the observer and a light modulator as an image matrix. The backlight is composed of a multitude of two-dimensional light source arrays which are disposed one behind another in a multitude of planes. Illumination elements in one of the light source arrays of the backlight are determined for activation according to the actual observer position. This method also allows light source tracking with respect to the distance between one or multiple observers and the display. Three-dimensional position information of all observer eyes are detected dynamically, assignable illumination elements of the backlight are opened, and bundles of rays are focused on the respective right/left observer eyes in synchronism with the modulated images.

The disadvantage of this display device is its low brightness, because only the light of one locally selectable point light source is available for illuminating the entire image per observer eye, and because the inactive light source arrays in the optical path absorb part of this light. In addition to its voluminous design, this three-dimensional backlight is difficult to manufacture.

The document U.S. Pat. No. 6,014,164 describes an autostereoscopic display for multiple observers with a light source tracking system. Light sources, which are arranged in pairs per observer, can be moved in x, y and z direction such to track the changing positions of the observers with the help of a control system. This method allows to continuously providing the observers sequentially with three-dimensional scenes on the information panel. The disadvantages described above also apply to this system because it also employs the method of light source tracking. In particular, expensive tracking means are required, because the observer-specific light source pairs must be tracked individually for each observer. These means do not allow a flat design of the display device to be achieved.

Prior art tracking methods are only able to deliver specific information to observers who are situated at various positions in a stereoscopic viewing space with considerable restrictions. The tracking range and brightness of the image matrix are limited. Moreover, the displays are voluminous and require expensive means, including computing means, to realise the tracking. The more observers are situated at various positions in front of the display, the greater becomes the volume of data to be calculated and, consequently, the more increases the delay between position detection and actual provision of sweet spots. It has thus become common practice not to calculate a certain part of the data in real time, but to store pre-calculated data in a look-up table, and to call up and to process such data as required. Another drawback is the fact that the storage capacity of the system will be exhausted quickly as the number of observers rises.

SUMMARY OF THE INVENTION

It is an object of the present invention to prevent or to minimise the disadvantages of prior art solutions mentioned above with the help of the inverse ray tracing method. The inverse ray tracing method used here determines the propagation of light based on the geometrical arrangement of optical components. It takes advantage of the property of light that optical paths are reversible, so that all rays can be traced back from the eye to the point where they originated.

Specifically, it is an object of this invention to provide displays with a sweet spot unit with a possibility of quick non-mechanical tracking of extended sweet spots according to the change of observer positions in a relatively large viewing space and to deliver to the individual sweet spot locations observer-specific image information displayed in an image matrix while maintaining a continuously high imaging quality and homogeneous illumination of the information panel.

At the same time, the tracking range is to be increased and the specific images for each observer are to be kept free from cross talk. Further, the volume of data to be calculated in real time for a tracking method is to be minimised and the volume of pre-calculated data stored in a look-up table is to be kept as low as possible while ensuring an acceptable computing time.

It is a known fact that scattering and diffraction of optical components in the optical path largely affect the imaging quality and thus the homogeneous illumination of the sweet spots. Scattering and diffraction may be directed in a horizontal or vertical plane or in all planes by choosing certain optical components. Using scattering and diffraction means purposefully, the homogeneity of the illumination and thus the quality of the sweet spots shall be further improved, in particular if the structure of the illumination elements is very fine.

This object is solved in an inventive manner on the basis of a tracking method for a display with sweet spot unit and image matrix, whereby in several process steps starting with a real time detection of the spatial positions of observer eyes by a position finder, illumination elements, which are arranged in a regular pattern in an illumination matrix, are activated in the optical path in order to provide defined sweet spots to serve observer eyes.

According to this invention, the object is solved by a tracking method which includes an inverse ray tracing, where rays are traced starting at the observer eyes through the image matrix and the imaging means to the illumination matrix. This activates exactly those illumination elements of the illumination matrix which the observer can see when looking through the image matrix. In combination with the imaging means, but irrespective of the type of imaging means used, the observer eyes receive the directed illumination assigned to them in sweet spots.

After continuous detection of the spatial positions of the eyes of at least one observer with the help of a position finder, the detected position information is transmitted to a control unit which executes the inverse ray tracing. Depending on the accuracy of the position finder and/or other parameters, in particular the distance between the observer eyes and the display, geometry of the required sweet spot is defined in discrete steps in the control unit by determining reference points. Number and position of reference points for each observer eye can be chosen freely. In this invention, a square arrangement of reference points is preferred, i.e. the inverse ray tracing is executed for at least four points, which preferably describe a rectangle.

The number of reference points must be large enough for the sweet spots to be homogeneously illuminated at all times, but small enough to keep the required computing power and storage capacity as low as possible. A larger extent of the sweet spots will for example become necessary if the observer is situated relatively far away from the display so that the accuracy of the position detection is significantly reduced.

The control unit performs an inverse ray tracing starting at each reference point to pixels which are arranged in a grid on the image matrix and which are defined by at least one parameter. The calculations are preferably not performed for all pixels, but only for pixels which are located in one row so that they can be defined by only one parameter according to the given grid of the image matrix.

The inverse ray tracing is continued from the pixels through the imaging means to the illumination elements. The calculation produces data records with address information of this illumination element which is imaged by the corresponding imaging means to the respective reference point. In a subsequent process step, a pattern of illumination elements to be activated is generated based on the address information, and said pattern is imaged by the imaging means in the form of sweet spots defined above for each observer eye. The method according to this invention can be applied to both monoscopic and autostereoscopic displays for at least one observer.

While the inverse ray tracing for each pixel is preferably carried out for the central row of the image matrix in real time, the control unit looks up pre-calculated data records for finding address information of illumination elements stored in a look-up table for the further ray paths. The address information for a pattern of illumination elements which corresponds to the current observer position is found by the control unit by way of comparing the parameters of the data records, and it is used to generate a corresponding sweet spot, whereby the viewing angle α characterises the ray path from a reference point to the viewed pixel of the image matrix. The pre-calculated ray paths of the rays from each pixel in the grid of the image matrix to each illumination element of the illumination matrix are stored in data records in the look-up table.

Aberrations caused by the imaging means, such as field curvature, are preferably already taken into account in the data records. The same applies to known material and manufacturing tolerances and the temperature-specific behaviour of the optical elements used.

Using the viewing angle as a parameter for inverse ray tracing has the advantage that the number of calculations to be executed can be reduced, because a certain viewing angle may not only apply to one observer situated at a certain distance to the display, but for several observers situated at different distances. If all observers are provided the same stereo image, the address information preferably only contains two separate lists of illumination elements for the detected positions of all left and right eyes of the observers, respectively. The look-up table contains for a multitude of rays and viewing angles pre-calculated data records which are used to generate the sweet spots for the relevant pixels of the image matrix and all illumination elements of the illumination matrix. The entirety of these data records represents the transfer data of the look-up table.

One embodiment of this invention comprises an illumination matrix which consists of a shutter with discretely controllable sub-pixels combined with a directed backlight. Alternatively, the illumination matrix may comprise discretely controllable, light-emitting illumination elements such as LEDs or OLEDs, thus making redundant the backlight and maintaining the flat design of the display.

Further, this invention relates to a device for providing a control signal for tracking a sweet spot of a sweet spot unit in a display which comprises adequate control and storage means to implement the method according to the invention.

According to another embodiment of the invention, at least one additional optical component in the form of a scattering or diffraction element is used in the optical path, which is why an additional parameter exists for finding the address information and thus to improve the image quality and the homogeneity of the illumination. The control unit additionally detects and considers an angle θ (in angular ranges), which defines the optical properties of the scattering or diffraction means.

The angle θ is the scattering angle of a scattering means, which comprises at least one scattering element, or the diffraction angle of a diffraction means, which comprises at least one diffraction element.

Because a multitude of rays is required to generate a sweet spot, a multitude of angular ranges related to the angle α is used in the calculation. The control unit detects these angular ranges preferably depending on the grid size of the actually used illumination matrix. In order to keep the calculation simple, the angular range information is detected and considered independently of the position of the scattering or diffraction means in the optical path, but always at positions which are touched in the inverse ray tracing process. All illumination elements of the illumination matrix which are found in the course of the inverse ray tracing process are activated in order to generate a defined sweet spot.

Thanks to the fact that scattering or diffraction means are considered in the inverse ray tracing process according to the invention, additional illumination elements will be activated in a simple manner. This further reduces or even eliminates imaging defects such as dark stripes, cross talk and poor contrast.

The method according to this invention as used for tracking a sweet spot of a sweet spot unit makes it possible to minimise the volume of transfer data stored in a look-up table and the computing time required. In particular if individual observers are simultaneously provided with different information in a two-dimensional and/or three-dimensional mode, observer-specific image information can preferably be tracked in real time and at high quality if the observers change their positions in the viewing space.

BRIEF DESCRIPTION OF THE DRAWINGS

Now, the method according to this invention and a corresponding device will be described in detail. In the representations is FIG. 1 a top view showing schematically a multi-user display with a sweet spot unit, an image matrix 4 and an observer eye 6 in a sweet spot 5, FIG. 2 a top view showing rays of light which run from reference points $P_1$ to $P_4$ of a sweet spot to pixels $D_p$ and $D_r$ of the image matrix 4 with corresponding viewing angles α, FIG. 3a showing a list 7 of illumination elements which defines a pattern M of illumination elements LE, FIG. 3b showing a detail of the illumination matrix 1 with activated and not activated illumination elements LE, FIG. 4 a top view showing a ray of light $RT_i$ which is followed in the inverse ray tracing process, said ray being scattered through a scattering means SF in an angular range of ±θ, and scattered ray portions $RT_{i0}$ to $RT_{i3}$ running towards the illumination elements LE, and FIG. 5 a flow chart showing the inverse ray tracing routine in a display device.

DETAILED DESCRIPTION OF THE INVENTION

The description preferably refers to an autostereoscopic display.

Now, the method according to this invention for tracking a sweet spot 5 of a sweet spot unit if one or multiple observers change their positions in the viewing space, and a corresponding device, will be described in more detail in conjunction with an autostereoscopic display and with reference to FIGS. 1 to 5. The method is based on the idea that for each observer position only those illumination elements LE are activated in order to generate a sweet spot which provide the stereo image to be displayed with ideal brightness and homogeneity and which maintain a high image quality. The object of this invention is realised with the help of an inverse ray tracing method and a corresponding device.

Figure 1:
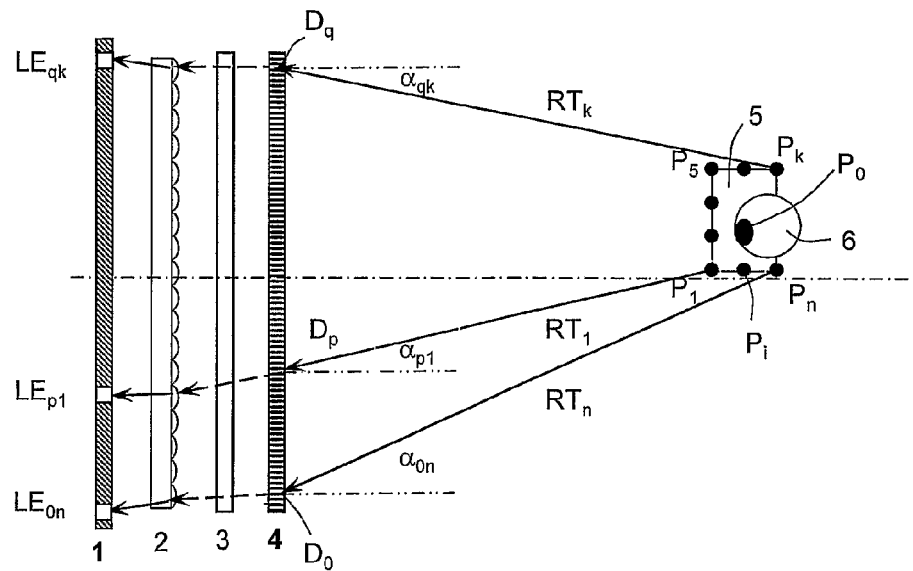

Referring to FIG. 1, the autostereoscopic display includes the following main components: a sweet spot unit comprising the illumination matrix 1 with illumination elements $LE_{0n}$ to $LE_{qk}$ and imaging means comprising a lenticular 2 and a Fresnel lens 3. A transparent image matrix 4 with pixels $D_o$ to $D_q$ which is permeated by the unmodulated light of the sweet spot unit is used to render the stereo image. For the sake of simplicity the Figures only show one observer eye 6 and one sweet spot 5 which is defined by reference points $P_0$ to $P_n$.

Figure 2:
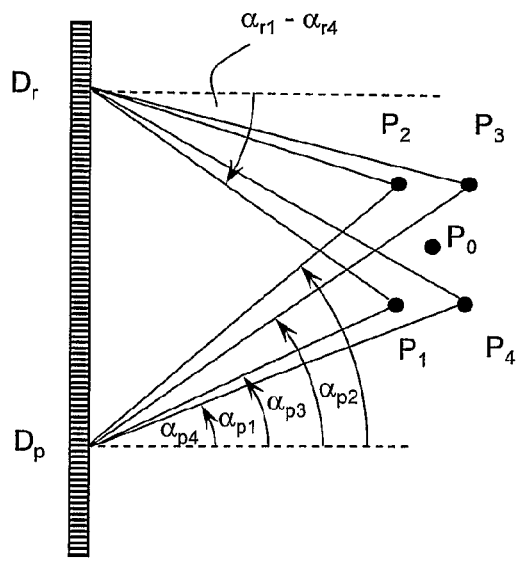

Demonstrating the inverse ray tracing process, FIG. 2 shows assumed ray paths running from the reference points $P_1$ to $P_4$ of the sweet spot to two randomly selected pixels $D_r$ and $D_p$ of the image matrix 4 and the corresponding four viewing angles $\alpha_{r1}$ to $\alpha_{r4}$ and $\alpha_{p1}$ to $\alpha_{p4}$, respectively.

Figures 3A, 3B:
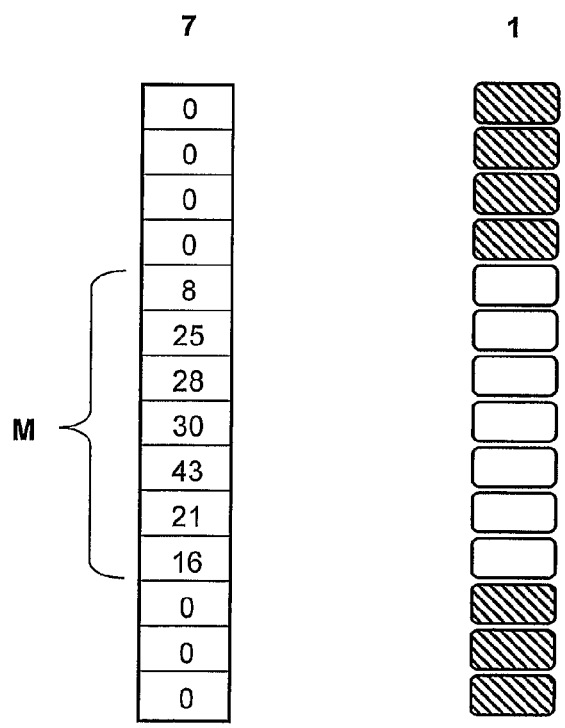

FIG. 3a shows a list 7 of illumination elements which comprises all address information of all illumination elements LE of the illumination matrix 1 found by the control unit, said list of illumination elements defining a pattern M. The illumination elements LE which generate the defined sweet spot 5 (see FIG. 3b) will be activated in accordance with said pattern M.

Figure 4:
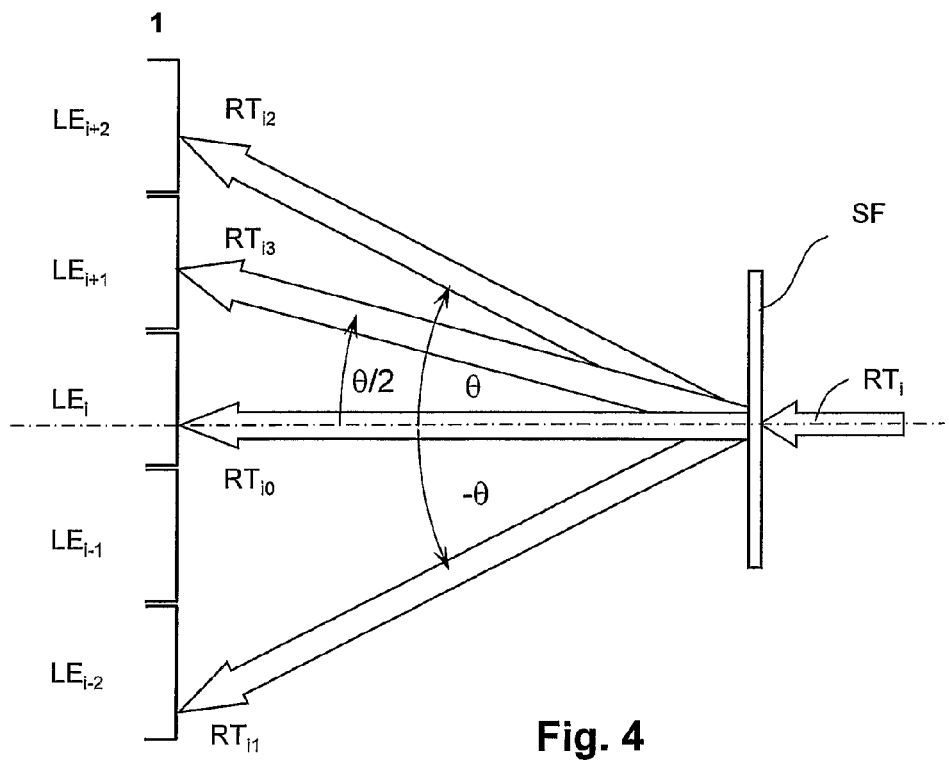

FIG. 4 shows the path of a calculated ray $RT_i$ traced from a randomly selected reference point and its scattering through an exemplary scatter foil SF with a defined scattering angle θ. It is shown how additional illumination elements LE can be activated when an additional optical component having an angular range of ±θ and ±θ/2, based on the scattering angle θ at the position of a scattering or diffraction means SF. The angular range ±θ is here only detected in the horizontal direction. Generally, this process may additionally be performed in vertical direction.

Figure 5:
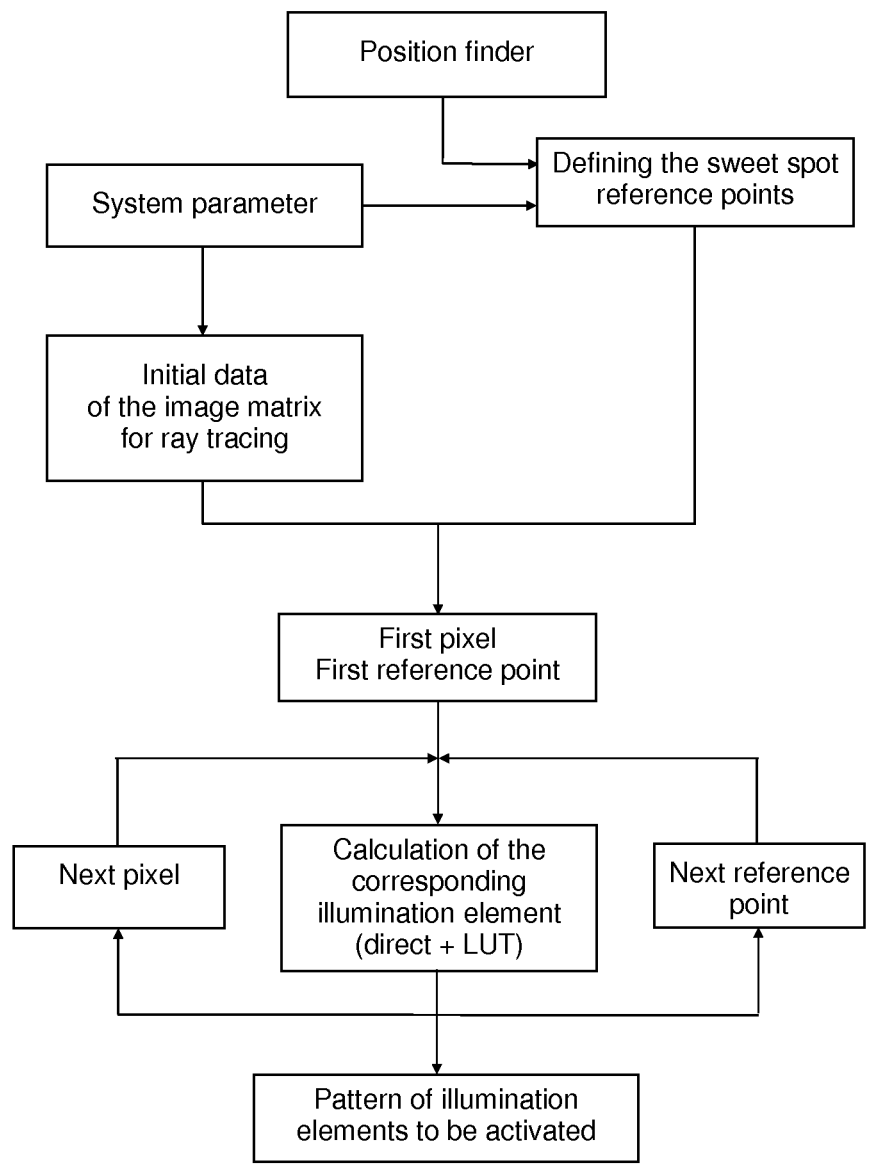

FIG. 5 is a flow chart which shows the major process steps of the inverse ray tracing routine.

The illumination matrix 1 is a major element of the sweet spot unit of a multi-user display. It continuously provides the observer with an ideally and homogeneously illuminated stereo image through a sweet spot 5, also if the observer moves. As described in the main patent application, position, number and extent of the sweet spots 5 to be generated can be controlled by a control unit and realised with the help of an illumination matrix 1, which consists of a multitude of illumination elements $LE_{0n}$ to $LE_{qk}$ which can be activated discretely, as shown in FIG. 1. In the described embodiment, the illumination elements LE are monochrome illumination elements of an LCD, which are illuminated by a backlight (not shown).

However, they may also be LEDs, OLEDs or similar point- or line-shaped illumination elements which are arranged in a regular pattern and which can be activated discretely.

The imaging means is a multi-part component which consists of a lenticular 2, that represents the optical imaging system, and a Fresnel lens 3 which serves as a field lens which images the sweet spot 5 on to an observer eye 6. Alternatively, the imaging means may only be a lenticular 2. If necessary, additional optical means may be integrated into the imaging means in order to enhance the imaging conditions. It is possible to complement the lenticular 2 composed of vertically arranged lenticules with at least one further lenticular composed of horizontally arranged lenticules. Further combinations of lenticulars are also possible. Instead of the lenticular 2, a lens array composed of lens elements arranged in a matrix or an optical imaging system composed of prismatic elements may be used.

In a further embodiment, the imaging means may additionally comprise a corrective array for field curvature correction. Depending on the type of image matrix 4 used, an additional retarder foil may be disposed in the optical imaging path in order to modify the polarisation of the light. A certain number of illumination elements LE are always assigned to each imaging element.

Referring to the top view in FIG. 1, an observer eye 6 is situated in a viewing space in front of the display, more precisely in an extended sweet spot 5 in a given plane. Initially, the sweet spot 5 does not exist in reality, but is predefined taking into consideration system parameters and viewing conditions. The extent of the sweet spot is described by reference points $P_1$ to $P_n$. The reference points $P_1$ to $P_n$ may also be arranged in any pattern, including three-dimensional patterns. The parameter n should be at least four, so to define a rectangle for inverse ray tracing in order to be able to realise distinct sweet spots 5. In this embodiment, n is 12. The depth of the sweet spot 5 may be lower or greater than shown here, depending on the accuracy of the position finder used and/or the position of the observer eye 6 with respect to the display. The sweet spot extent can be the smaller the more accurate the position finder works. Point $P_0$ denotes the eye position as detected by the position finder. If there is more than one observer, the position of all eyes 6 in the viewing space will be detected dynamically, and the corresponding position information will be provided to the control unit for inverse ray tracing.

After continuous real-time detection of the spatial position of an observer eye 6 in point $P_0$, an imaginary sweet spot 5 is defined around the eye with the help of discrete reference points $P_1$ to $P_n$. Ray paths $RT_1$ to $RT_n$ from each of the reference points $P_1$ to $P_n$ to pixels $D_0$ to $D_q$ in a selected row of the image matrix 4 are calculated in the control unit (see FIG. 1). The image matrix 4 is divided into a grid with constant pitch which forms the basis for the pixel calculations. The pitch of the grid may or may not be identical to the pitch of the image matrix 4. However, it is also possible to use a grid which consists of several regions with different pitches. However, in the context of inverse ray tracing it is advantageous to use a larger pitch than that of the image matrix, because this reduces significantly the computing power required.

The pixels $D_0$ to $D_q$ are identified by the x coordinate within the row in which they are located. In practice, the central row of the image matrix is used, because observers prefer to view towards the centre of the image display. Another parameter required in the calculation is the viewing angle α under which the rays from the reference points $P_1$ to $P_n$ hit the pixels $D_0$ to $D_q$ of the grid. It has been found empirically that approximately 4,000 viewing angles α should be used to be able to achieve a sensible calculation result. If the number of viewing angles was considerably fewer than 4,000, the tracking precision would be adversely affected.

In the case of a two-dimensional imaging means, a pixel D is not only defined by its x coordinate, but by its x and y coordinates.

In the described embodiment in FIG. 1, the illumination elements $LE_{0n}$ to $LE_{qk}$ are monochrome illumination elements of a shutter which are illuminated by a backlight (not shown). The observer eye 6 is situated in the reference point $P_0$. Rays of light running from the outer reference points $P_k$ and $P_n$ to the outer pixels $D_0$ and $D_q$ as calculated by the inverse ray tracing method are shown in the Figure. A ray of light running from the reference point $P_1$ to the pixel $D_p$ is shown together with the viewing angle $\alpha_{p1}$ under which the ray hits a pixel of the image matrix 4.

The ray path from the pixel $D_p$ through the imaging element ends in the illumination element $LE_{p1}$ of the illumination matrix 1, said element being preferably located in the central row of the image matrix 4. This calculation is carried out for all pixels $D_0$ to $D_q$ and for a large number of viewing angles α. This ensures that all illumination elements $LE_{0n}$ to $LE_{qk}$ which must be activated in order to achieve a homogeneous illumination of the sweet spot 5 defined by the reference points $P_1$ to $P_n$ are hit. The illumination elements $LE_{0n}$ to $LE_{qk}$ hit by the rays of light will be activated together with the corresponding columns.

If too few illumination elements $LE_{0n}$ to $LE_{qk}$ are activated, the sweet spot 5 and the switched on image will be insufficiently illuminated. On the contrary, if too many illumination elements $LE_{0n}$ to $LE_{qk}$ are activated, the sweet spot 5 additionally illuminates the other eye, thus leading to cross talk and a reduction of the stereo image contrast.

Another variation of a defined sweet spot is shown in FIG. 2. It can be seen how in the course of the inverse ray tracing process the rays of light run from the four reference points $P_1$ to $P_4$ to two pixels $D_r$ and $D_p$, thus having different viewing angles $\alpha_{r1}$ to $\alpha_{r4}$ and $\alpha_{p1}$ to $\alpha_{p4}$, respectively. This sweet spot configuration is preferably used if an observer is situated very close to the position finder, so that the position of the observer can be defined by very few reference points with great accuracy.

Real-time inverse ray tracing from the reference points P of a defined sweet spot 5 to corresponding pixels D of a grid of the image matrix 4 produces as a result the input data for retrieving pre-calculated data records stored in a look-up table (LUT).

The look-up table contains pre-calculated data records, which represent the results of calculations of a large number of ray paths which have all been carried out according to the same algorithm, and the real-time calculation of which would take too much time. This is why all ray paths from each pixel D in the grid of the image matrix 4 through the imaging means to the two-dimensional coordinates of the illumination elements LE of the illumination matrix 1 were pre-calculated and stored in data records in the look-up table LUT.

However, it is also possible to calculate the ray paths up to the lenticular 2 in real time. This reduces the number of data records and thus saves storage capacity.

A comparison of the parameters of the data records calculated in real time and those pre-calculated and stored in the control unit produces address information of the illumination element LE which is imaged by the lenticular 2 and Fresnel lens 3 to the corresponding reference point P. An illumination element LE may be hit several times by the imaginary rays of light, as can be seen in the list 7 of illumination elements shown in FIG. 3a. The number in the list indicates how often an illumination element LE was hit during inverse ray tracing starting at the reference points P. However, the number of hits is irrelevant when it comes to activating the illumination elements LE. Generally, all illumination elements LE which have been hit at least once by a ray of light RT will be activated. Based on the address information, the control unit generates a pattern M of all illumination elements LE which activate the corresponding columns of the illumination matrix 1 (see FIG. 3b). Now, this pattern is used to realise the sweet spot 5 for the observer eye 6 exactly at the defined position.

If there are multiple observers in front of the display, a sequence of patterns M of illumination elements LE to be activated is determined that corresponds with the actual number of observer eyes. For example, first all left eyes of the observers can be provided with the required stereo information using the inverse ray tracing method, then all right eyes, if all observers want to see the same content.

If according to the described inverse ray tracing method several illumination elements LE are not activated, the stereo image is perceived from the position of the sweet spot 5 with the above-mentioned disadvantages. For example, the margins of the individual lenticules may be discerned as dark stripes in the image, and the illumination of the image matrix 4 may be inhomogeneous. It has proven to be advantageous to additionally consider the scattering or diffraction of light in the inverse ray tracing process.

According to another embodiment of this invention, an angle θ is introduced which may be a scattering angle or a diffraction angle. It is detected and considered in the course of the inverse ray tracing process in defined angular ranges. For the sake of simplicity, the invention will be described below with the help of a scattering means. However, a diffraction means may be used analogously in other applications. The imaging means is preferably assigned to one scattering means with at least one scattering element in the optical path. The scattering element may be a scatter foil SF with a defined scattering angle. It may be disposed in front of or behind the Fresnel lens 3 or at another position in the optical path. If several scatter foils SF are used, each of these foils may have a different scattering angle, so that additional parameters in the angular ranges may be detected and considered to find address information, as shown in FIG. 4. The same applies analogously to diffraction means and diffraction angles.

The invention also covers the possibility that the angular range may be detected and considered in both horizontal and vertical direction so to find additional address information. Referring to the embodiment shown in FIG. 4, it is demonstrated schematically for one traced ray of light $RT_i$ how an angular range ±θ is defined based on the known scattering angle θ of a scatter foil SF. The selected ray of light $RT_i$ comes from a random reference point P and has passed through the image matrix 4 in a pixel D. It is scattered by the scatter foil SF so that a number of rays of light $RT_{i0}$ to $RT_{i3}$ (indicated by arrows) run to illumination elements $LE_{i-2}$ to $LE_{i+2}$ of the illumination matrix 1. If the angular range ±θ is used for inverse ray tracing, every second illumination element will be activated. If the angular ranges are divided by 2 again (θ/2, as shown in FIG. 3), the illumination elements $LE_{i-1}$ and $LE_{i+1}$ will additionally be hit by rays in the course of the inverse ray tracing process. The number of illumination elements LE to be activated, which contribute to the homogeneous illumination of the defined sweet spot 5, can thus be found more precisely and the risk of non-activation of illumination elements LE is further minimised. In reality, the number of rays of light to be additionally activated is much greater.

The angular range to be used in particular cases also depends on the grid size of the illumination matrix 1 used.

The finer the sizing of the illumination matrix 1, the finer must the angular range used for inverse ray tracing be defined, based on the actual scattering or diffraction angle. It must be noted, however, that the finer the angular range the more address information is found and the more computing time is required. This is why it is important when employing the inverse ray tracing method to put only reasonable efforts into means and computing power while still achieving a good imaging quality and homogeneous illumination of the defined sweet spots 5.

All found values of many angular ranges will be used by the control unit to detect and to consider address information. The address information includes in addition to the x coordinate a viewing angle α and an angle θ or θ/2 corresponding to the scattering angle or diffraction angle. The additionally found address information increases the accuracy of the minimum number of illumination elements LE to be activated that generate the sweet spot 5.

Referring to FIG. 5, a flow chart illustrates the inverse ray tracing process from the detection of the position of an observer eye 6 by a position finder to the definition of a pattern M of illumination elements LE to be activated in order to generate the defined sweet spot 5.

This invention also relates to a device, more specifically a processor which comprises several functional units like control means and storage means, as defined in the independent device claim, for the implementation of the inverse ray tracing method described above.

The inventive method for tracking a sweet spot of a sweet spot unit preferably provides a display with the possibility to define an optimum pattern of illumination elements at minimum data volume to generate in an observer plane a sweet spot in which the observer sees specific information provided by an always homogeneously illuminated image matrix. Because aberrations are already considered in the inverse ray tracing method, the display preferably only exhibits very little optical errors. Using a look-up table boasts the advantage that the individual illumination elements required to generate the sweet spot do not have to be re-calculated repeatedly.

Consequently, the sweet spot and the corresponding stereo image can be tracked quickly and precisely in real time according to the movement of an observer eye, and the tracking range for an observer can be increased at the same time.

List Of Reference Numerals
1—illumination matrix
2—lenticular
3—Fresnel lens
4—image matrix
5—sweet spot
6—observer eye
7—list of illumination elements
LE—illumination element
D—pixel
M—pattern
P—reference point
RT—ray of light SF—scatter foil
α—viewing angle
θ—angle (scattering or diffraction angle)

The invention claimed is:

1. Method for tracking sweet spots of a sweet spot unit of a display, where the sweet spot unit comprises an illumination matrix with a multitude of controllable illumination elements, and imaging means in order to image directed light in the form of sweet spots on to the eyes of at least one observer, said light being modulated with an image information by pixels of an image matrix, and where a position finder detects position information of the observer eyes to be transmitted to a control unit, which uses the position information to determine illumination elements to be activated for generating sweet spots for the detected observer eye positions, wherein the control unit
- defines reference points around each observer eye with the help of the position information, said reference points defining the geometry of an extended sweet spot, and
- performs for each reference point an inverse ray tracing starting at each reference point through selected pixels of the image matrix and through the imaging means to the illumination matrix, in order to determine address information of the illumination elements which are to be activated by the control unit to emit light for generating the defined sweet spot together with the imaging means.

2. Method according to claim 1 wherein the selected pixels are distributed across the image matrix such that the light of the sweet spot directed at the observer eye illuminates a large area of the image matrix.

3. Method according to claim 1 wherein the geometry of the sweet spots is defined by the control unit depending on the position, preferably on the distance between the observer eyes and the display.

4. Method according to claim 1 wherein the ray path from a reference point to a pixel is characterised by a viewing angle α, and α takes a large number of values for each pixel.

5. Method according to claim 1 wherein the control unit for finding address information additionally detects and considers an angle in angular ranges, said angle defining a scattering angle of a scattering means or the diffraction angle of a diffraction means.

6. Method according to claim 5 wherein the scattering means comprises at least one scattering element, or where a diffraction means comprises at least one diffraction element.

7. Method according to claim 5 wherein the angular ranges relating to the angle θ are integrated into the process of finding address information independently of a position at which the scattering means or a diffraction means is disposed in the optical path.

8. Method according to claim 5 wherein the control unit finds the angular ranges depending on the grid size of the illumination matrix used.

9. Method according to claim 7 wherein angular ranges which are relating to the defined angle θ are also comprised in the pre-calculated data records which are stored in the look-up table.

10. Method according to claim 1 whereby the paths of rays from each selected pixel of the image matrix to each illumination element of the illumination matrix were pre-calculated and stored in the form of transfer data records in a look-up table.

11. Method according to claim 10 wherein an electronic parameter comparison is carried out by using the look-up table in order to generate address information of the respective illumination element which is imaged to the reference point of the sweet spot.

12. Method according to claim 11 wherein the address information includes separate lists of illumination elements for all left observer eyes of multiple observers and for all right observer eyes of multiple observers, respectively, and where the same information is displayed for all eyes.

13. Device for controlling a sweet spot unit for a display with an image matrix with pixels, an illumination matrix with a multitude of controllable illumination elements, and with imaging means used to image directed light on to observer eyes of at least one observer in sweet spots, and with a position finder used to detect position information of observer eyes, and with a control unit using the position information to determine illumination elements to be activated for generating sweet spots for the detected observer eye position, wherein the device comprises
- control means to define reference points around each observer eye with the help of the position information, said reference points definine a geometry of an extended sweet spot and to carry out an inverse ray tracing starting at each reference point through selected pixels of the image matrix and through the imaging means to the illumination matrix so to find address information of the illumination elements which are to be activated by the control unit to emit light for generating the defined sweet spots together with the imaging means.

14. Device according to claim 13 with scattering or diffraction means whose optical properties define additional address information of illumination elements to be activated additionally.

15. Device according to claim 13 wherein the illumination matrix is a shutter combined with a directed backlight.

16. Device according to claim 13 wherein the illumination matrix comprises light-emitting illumination elements which can be activated discretely.

17. Device according to claim 13 comprising storage means for storing pre-calculated data records for the ray paths from defined pixels through imaging means to the illumination elements and to carry out a parameter comparison to produce address information of illumination elements.

* * * * *